US00RE35322E

United States Patent [19]

Owen et al.

[11] E Patent Number: Re. 35,322

[45] Reissued Date of Patent: Sep. 3, 1996

[54] METHOD AND APPARATUS FOR COMPOSITE POLE REPAIR

[75] Inventors: Richard A. Owen, Conroe, Tex.; Richard C. Hannay, 11807 S. Red Cedar Cir., The Woodlands, Tex. 77380

[73] Assignee: Richard C. Hannay, The Woodlands, Tex.

[21] Appl. No.: 87,166

[22] Filed: Jul. 2, 1993

Related U.S. Patent Documents

Reissue of:

[64] Patent No.: 5,027,575
Issued: Jul. 2, 1991
Appl. No.: 395,959
Filed: Aug. 17, 1989

U.S. Applications:

[62] Division of Ser. No. 206,579, Jun. 14, 1988, Pat. No. 4,918,883.

[51] Int. Cl.[6] ..... E02D 27/42; E04C 5/07

[52] U.S. Cl. ..... 52/741.14; 52/778; 52/170; 52/514; 52/515; 52/741.11; 52/736.4; 156/71; 156/94; 405/216

[58] Field of Search ..... 52/728, 727, 170, 52/741, 742, 514, 515; 156/71, 94; 405/216

[56] References Cited

U.S. PATENT DOCUMENTS

| | | | |
|---|---|---|---|
| 967,952 | 8/1910 | Moran . | |
| 1,001,144 | 8/1911 | Hilliard . | |
| 2,109,508 | 3/1938 | Schmittutz | 52/742 |
| 3,390,951 | 7/1968 | Finger et al. | 405/216 |
| 3,397,260 | 8/1968 | Lamberton | 405/216 |
| 3,562,403 | 2/1971 | Monahan . | |
| 3,938,293 | 2/1976 | Warjone et al. . | |
| 4,033,080 | 7/1977 | Fukushima . | |
| 4,068,483 | 1/1978 | Papworth | 61/54 |
| 4,306,821 | 12/1981 | Moore | 405/216 |
| 4,312,162 | 1/1982 | Medney . | |
| 4,371,018 | 2/1983 | Arnold . | |
| 4,618,287 | 10/1986 | Kinnan . | |
| 4,621,950 | 11/1986 | Kinnan . | |
| 4,724,793 | 2/1988 | Sletten | 118/35 |
| 4,743,142 | 5/1988 | Shiraishi et al. . | |
| 4,779,389 | 10/1988 | Landers | 405/216 |
| 4,892,601 | 1/1990 | Norwood | 405/216 |
| 4,918,883 | 4/1990 | Owen et al. | 405/216 |
| 4,921,555 | 5/1990 | Skiff | 405/216 |

FOREIGN PATENT DOCUMENTS

| | | | |
|---|---|---|---|
| 31943 | 3/1981 | Japan | 405/216 |

*Primary Examiner*—Wynn E. Wood
*Attorney, Agent, or Firm*—Matthews & Associates

[57] ABSTRACT

This invention provides a method for repair for poles which have been damaged by environmental effects, which is easily transportable, simple to install, and easily adaptable to many classes of poles. The method involves excavating around the pole, cleaning the surface of the pole, pumping a fumigant into the pole, applying a bonding agent to the clean surface, and then applying strips of a composite fiberglass mat and resin to the pole in a controlled manner until a desired casement thickness has been achieved. The repair is completed by application of an ultraviolet resistant coating to the pole.

4 Claims, 1 Drawing Sheet

METHOD AND APPARATUS FOR COMPOSITE POLE REPAIR

Matter enclosed in heavy brackets [ ] appears in the original patent but forms no part of this reissue specification; matter printed in italics indicates the additions made by reissue.

This is a [division of copending] *reissue of U.S. Pat. No. 5,027,575, which is a division of* application Ser. No. 206, 579, filed on Jun. 14, 1988, now U.S. Pat. No. 4,918,883.

FIELD OF THE INVENTION

This invention relates in general to the repair of wooden support structures and in particular to the in situ repair of wooden utility poles.

BACKGROUND OF THE INVENTION

Wooden poles are widely used for supporting overhead power and communication lines. A great number of these wooden utility poles are in use in remote locations difficult to access by any type of equipment. Although the majority of the poles have been treated to retard decay, the primary reason for replacing such poles is caused by decay at or near groundline. Reasons for decay include preservatives, that do not penetrate to the center of the pole, soil that may contain a particularly aggressive chemical content, or biological agents. The decay or deterioration puts at risk the structural integrity of the pole. Similar damage to the structural integrity of the pole could be caused by weather, insects, birds, rodents, or other animals. This damage may occur anywhere along the length of the pole and not just at groundline.

Although such damage might not occur to a non-wooden pole, wooden poles are widely utilized because of the ready availability and relative inexpense of materials. In addition to this, metal poles are also susceptible to damage from weather and ground conditions.

Many methods have been proposed in the prior art for repairing such damaged standing poles. In the beginning, the unsound standing pole was simply removed and replaced with a new pole. This is impractical due to the labor and time consuming requirement for removing the power or communications lines carried by the pole.

One prior method of repair involves pole reinforcement, which can be done by setting a wooden stub by the weakened pole and binding the stub to the pole. A variation of this method is also disclosed in U.S. Pat. No. 3,938,293. This patent depicts an apparatus for installing a driven splint adjacent to a weakened pole. The large driving apparatus required and complicated steps of the method are not cost effective, and therefore the method of this patent would rarely be chosen, except for locations that can be easily reached by heavy equipment, and then only for poles where a repair without a disruption of the services or necessity for otherwise supporting or disengaging the power or communications lines is required.

Another prior repair method involves cutting off the pole above the damaged, embedded lower portion, supporting the pole and the power or communications lines that it carries, and then removing and replacing the base of the pole with some type of replacement footing. An example of this technique is disclosed in U.S. Pat. No. 4,621,950 and its related U.S. Pat. No. 4,618,287. The disadvantages of this method are also readily apparent. In fact this is not an improvement over the method of simply replacing the standing pole because of the need to support the pole during the replacement of the damaged lower end. In addition this method has not been proven to be cost competitive with a simple replacement of the damaged pole with a new pole. The requirement of a large truck mounted with complicated machinery is also shared by these methods.

A similar repair method is disclosed in U.S. Pat. No. 4,033,080 which discloses a method of replacing the lower part of a wooden pole with a concrete segment to be embedded in the ground. In order to make this repair, the existing pole must be cut in two, the upper part of the pole supported, and lower part of the pole pulled from the ground prior to the installation of the concrete base, which is driven into the ground. This method has the same drawbacks as that previously described U.S. Pat. Nos. 4,618,287 and 4,621, 950.

Yet another method is disclosed by U.S. Pat. No. 4,371, 018. This reference discloses an apparatus for lengthening or shortening poles. The method involves raising the pole vertically until its lower end is clear of the ground so that a replacement for the lower end can be attached, afterwards the pole and the replacement are joined together, after which the pole and stub are lowered vertically into the ground to the required depth. The ground is then consolidated to complete the repair. In addition to the disadvantages discussed and readily apparent that this method shares in common with the previous described references, this reference discloses a complicated and expensive device which must be mounted on a heavy piece of equipment and must be used in the field.

SUMMARY OF THE PRESENT INVENTION

The present invention describes a method of repairing wooden support structures, in particular, wooden utility poles such as those utilized by power and telecommunications transmission companies. This invention is especially concerned or related to the repair of these wooden utility poles which have been damaged by rot at or near the ground surface, and further provides a region of reinforcement for the utility poles for a distance above and below the ground surface. This invention teaches a method of repairing such damaged utility poles which can be easily done in situ by a small crew of workmen without the need for any complicated or expensive machinery or equipment. This invention, unlike the prior art devices, is therefore particularly suited for use on the many poles that are located in sites inaccessible to transport. The improved repair method of this invention provides a method of repair for all such utility poles that can be quickly accomplished with a minimum of manpower and without a disruption of the power or communications service.

In summary, this invention provides a simple method for repair of wooden poles which have been damaged by environmental effects which is easily transportable, simple to install with a minimum of hand tools and easily adaptable to any class or height of utility poles by a simple field measurement.

The invention provides a method of repairing utility poles comprising digging around the base of the utility pole to expose the pole all the way around to a depth of about 3 or 4 feet from the ground surface. Next the pole is simply cleaned to remove any of the ground material that may adhere to the pole by a simple means as scraping or wire brushing. This clean-up includes the step of removing surface decay. The pole is then treated dispersed around the decay area. The fumigant kills any biological agents and so adds to the life of the pole. Then a coating is applied to the pole to enhance the bonding of the wrap to the surface of the utility pole. Following that, the wrap is applied to the cleaned area of the pole. The wrap consists of a series of strips of fiberglass mat in length as long as the area of the pole that has been cleaned or approximately six feet and about a foot and a half in width. These fiberglass strips are saturated with a polyester or epoxy resin, or with a vinyl ester, and then are placed vertically against the cleaned and coated area of the pole and rolled into place with a paint roller. One strip at a time is installed against the pole, and the strips are overlapped by half a the workman proceeds around the utility pole. The workmen continue in this manner, placing a series of overlapping strips in place and rolling then out against the pole until enough layers are in place to provide the strength required by the size and type of utility pole. The field team can tell when enough layers have been placed by making a simple measurement of the total thickness of the layers of wraps. The wrapped layers are then painted with a ultraviolet resistant coating and the installation of the repair is complete. After the surface of the repair has set, the hole can be filled in and consolidated and the repair of the pole is complete.

DETAILED DESCRIPTION OF THE PREFERRED EMBODIMENT

The present invention will now be described in more detail with reference to the accompanying drawings.

As previously mentioned, this invention relates to the repair of standing poles in situ. Primarily, this invention is directed towards the reinforcement or repair of wooden utility poles which have decayed because of their exposure to ground conditions or weather elements. In addition this method applies to the repair of wooden poles and cross bars that have been structurally compromised or damaged by insects, rodents, birds, (particularly woodpeckers), or any other environmental effect.

Although the method of repair of such structural damage caused by the birds, animals, and insects is basically identical to that for the repair of decay, there is one different, initial step for the cases of repair for bird, animal, or insect damage to the exterior. In these cases the pole is damaged primarily from the exterior, unlike decay which, in general, occurs from the inside. The initial step that must be taken when repairing the insect or animal damage involves the restoration of the original diameter of the pole. This may be accomplished by numerous means. One method would be to fill the hole with some material, examples are: an expanded cell foam, some type plastic filler material, or some type of paste or grout packing. Because most such external openings do not extend for a large expanse across the surface of the pole, the only purpose of this packing or filler material is to restore the original complete cylindrical shape of the surface of the pole so that the composite wrap method may be applied. In addition, the packing will keep moisture from becoming trapped by filling any voids.

Figure 1:
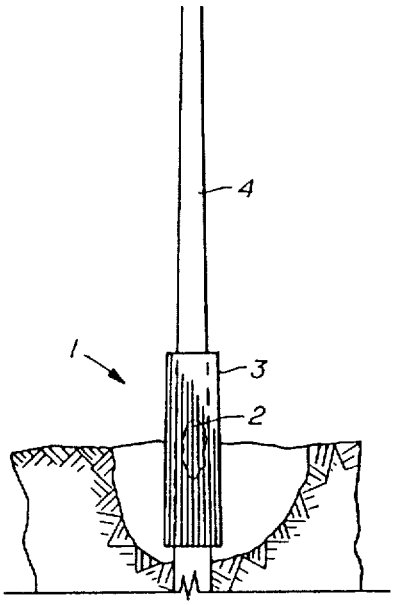
FIG. 1 shows a utility pole with the apparatus for repair installed.
Figure 3:
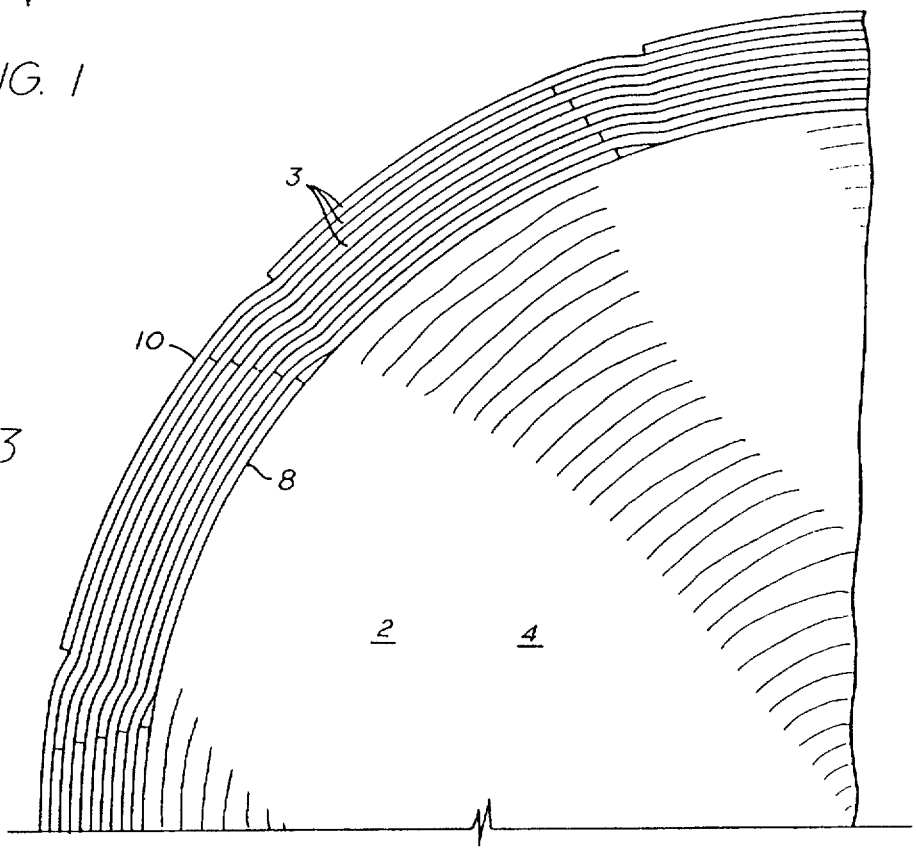
FIG. 3 shows a cross-section of a utility pole and the laminations of the glass mat components.

As shown in FIG. 1 there is an installed composite repair prior to the refilling of the excavation made for the repair. FIGS. 1 and 3 also indicate the area 2 of damage to the pole caused by decay.

The components of the repair apparatus and method here described, comprise a quantity of fiberglass mats which are supplied in strips 3 of approximately six feet in length by sixteen to eighteen inches in width. This glass is supplied with the primary fibers 5 that will run in the vertical direction parallel with the longitudinal wood fibers of the pole as the strips are installed. The reason for this is that the maximum number of fibers are required in the vertical direction to resist the tensile stresses that will be the result of wind load upon conductors and cable.

The fiberglass blanket utilized in the primary embodiment of this invention is supplied with 50% of the fibers 5 running in the vertical direction, 25% of the fibers 6 at 45 degrees to those vertical fibers and the remaining 25% of the fibers 7 running at 90 degrees to the second set of fibers, which results in fibers 7 also being placed at 45 degrees to the primary longitudinal fibers 5. This particular orientation of fibers within the fiberglass blanket is not common in the industry. Although this orientation is the best method now known for arranging the fibers, further research may indicate that the desired placement of the fibers would be in a similar arrangement, but with different percentages. The weight of the glass mat is not particularly important because of the method of installation, which is described in greater detail below. The reason for the arrangement as previously mentioned is that the primary fibers run in the vertical directions to handle the bending stresses that are transferred to the composite encasement, but in addition to that, there is a need for some hoop strength.

The reason the hoop strength is required is because since most of the applications for this repair method are related to wooden poles, installed into the ground, there will be moisture migrating up the pole. The composite repair encapsulates the wooden pole, with a substantially air tight seal to a distance of approximately three feet above the ground. In essence what has occurred is that the ground line has been moved up three feet. The moisture then migrates up that distance. If there is no hoop strength at all, the three feet of the pole above the ground begins to swell from taking on water, and without any hoop strength provided by a horizonal component from the fibers, the composite encapsulation would split apart.

As mentioned, it is anticipated that further attention to the design of the orientation of the fibers in the glass mat would indicate that some savings in material could be realized by providing a different orientation. A probable likely design would provide 80% of the fibers running in the vertical direction with 20% located to provide the necessary hoop-strength as described above. In other words, 80% of the fibers would be orientated as are the fibers 5, with 10% orientated as fibers (6) and another 10% orientated as fiber 7 of FIG. 2. However, special designed glass would cost more, and until this method is more widely used the expense and redesigning and specially ordering a glass mat would not be worth the expense. At present a fiberglass weave marketed under the name KNYTEX CDB-340 has been found to work well, but equivalents can be selected using the parameters outlined above.

Figure 2:
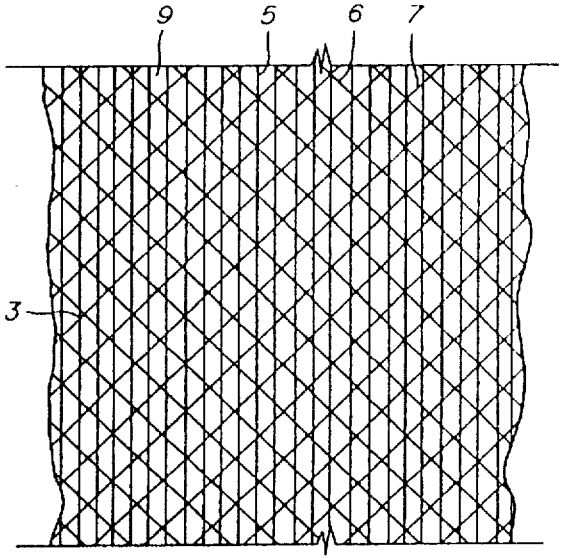
FIG. 2 shows a segment of the glass mat component of the repair kit.

In addition to the fiberglass mat component of present invention, the invention also comprises a coating 8, a composite resin 9 and in most cases, will also include an exterior ultraviolet resistant coating 10. FIGS. 2 & 3. These components and their placement and purpose will now be further described.

The primary embodiment of the present invention utilizes a coating whose method of application and sequence will be described in more detail below. The purpose of this coating is to enhance the bonding of the composite encasement to the exterior fibers of the utility pole. This invention therefore achieves a bonding which allows for a load transfer both above and below the structurally compromised area from the undamaged portion of the utility pole to the composite installed around the exterior of the pole about the structurally damaged area. For example, as depicted in FIG. 1, if the bad area is 18 inches in length and located as it will be at the ground line, this invention aims to insure that for a minimum area of one or two pole diameters above and below the damaged area, the composite encasement will be well bonded to the surface of the wood pole. Because the pole loads from the outside not the inside, by providing this encasement about the exterior of a pole, the composite repair insures a pole that will structurally take at least the same load as an undamaged pole.

The wooden material of these utility poles typically has a fiber stress of 8,000 PSI. The composite repair encasement installed typically has a tensile strength in the nature of 45,000 PSI. By providing a sound bond between the encasement composite repair and the wooden pole, as traverse load is put on the pole and the pole develops bending stresses, they will be transferred to the composite encasement rather than to the structurally compromised area of the pole. Testing indicates that in every case of a utility pole repaired with the method of this invention, the repaired poles will break at approximately the same locations as a structurally sound, new utility pole will break.

Two basic problems require the coating that is applied to enhance the bonding between the encasement and the utility pole. The first problem is moisture. Moisture exists in the ground, and may have been absorbed in the utility pole to such a degree that the pole is wet. The second problem necessitating some type of coating to enhance the bonding is that utility poles are commonly treated with some type of preservative, a common example of which is creosote. Over a period of time the preservative migrates down the pole and tends to migrate out into the soil along the area right at ground line. Generally there will be a considerable amount of whatever preservative the pole was treated with still existing in the portion of the pole at or below ground line, which is the portion of the polo which is subject to structural compromise.

After cleaning and prior to coating, the pole is treated with fumigant to kill any biological agents. Holes are drilled into the pole; dispersed about the decay area. Next, a fumigant is pumped into the pole.

Three types of coatings have been tried, epoxy, urethanes, and shellac. Epoxies are basically impervious to water but sensitive to hydrocarbons, such as the creosote coating preservatives common in utility poles. On the other hand, urethanes are impervious to hydrocarbons but sensitive to water. In this respect it's a compromise. There are a variety of both epoxies and urethanes on the market and many of them would be suitable for this coating use. The coating is required to minimize the effect of the moisture within the pole or the preservative upon the composite resin during the curing period. The basic criteria for choosing an epoxy or urethane would therefore be to choose an epoxy that is relatively impervious to hydrocarbons or conversely, to choose a urethane that is not highly sensitive to moisture.

The next component of the composite repair will be the resin 9 itself, FIG. 2. Resins generally are either epoxies, polyesters, or vinylesters. Polyesters are relatively moisture sensitive and if the coating 8 previously described does not achieve a good seal, the result will then be a slow cure between the polyester and the surface of the utility pole. Although polyesters have been mentioned as a primary embodiment or as the first choice for the primary embodiment, they are followed as closely by epoxies and vinylesters. In these cases we are discussing common epoxies or component urethanes that are readily available in the industry, and as previously discussed criteria for choosing the components for this composite will be the preservative coatings applied to wooden poles, and the requirement of a good bond between the composite encasement and the surface of the wooden pole.

The last component of the composite encasement of the present invention is the ultraviolet resistant coating 10, FIG. 3.

The ultraviolet resistant coating is required because the composite encasement is exposed to the weather, and ultraviolet has a deteriorating effect on composite resins over a period of time. As is also commonly known in the industry, there are numerous commercial coatings available for composites to provide resistance to ultraviolet and weather conditions. One example is a Polane urethane. Although the coating 10 is really only required for the above ground portion of the pole, it would typically be applied to the entire length of the composite encasement.

The components of the composite repair apparatus of the present invention have been described as comprising; a fumigant coating 8 applied to the exterior of the pole 4 to enhance the bonding between the pole 4 and the composite encasement 1, multiple strips of a fiberglass mat 3 with particular fiber (5, 6, 7) orientation and of approximately 18" width and approximately 6' in length, a composite resin 9 and some type of ultraviolet resistant coating 10. See FIGS. 2 & 3.

Although the approximate dimensions of the fiberglass mat strips have been described and illustrated, the number has not, because the number will vary depending upon the class and height of the utility pole being repaired.

Wooden poles used in this country are classified for strength in accordance with ANSI 05.1, Specifications and Dimensions for Wood Poles. Poles of a given class and height develop the same nominal strength regardless of wood species by providing the circumference (diameter) necessary for each species. Since most of the utility poles are Southern pine or Douglas fir, (which have the same dimensional requirements), these woods have been evaluated for the purposes of patenting this invention. ANSI Pole Classifications identify the lateral load a pole is expected to resist as follows:

TABLE 1

ANSI 05.1 LATERAL LOADS

| Class | Load (lbs) |
|---|---|
| 4 | 2400 |
| 3 | 3000 |
| 2 | 3700 |
| 1 | 4500 |
| H1 | 5400 |
| H2 | 6400 |

The size (circumference) of the poles has been determined by applying the lateral load at a point two feet below the top of the pole and computing the stress at the critical point on the pole, determined by standard principles of engineering.

For the purposes of the present invention, an engineering study was done considering the critical section for this repair system as being at the ground line, assuming that all forces would be carried by the composite encasement and assuming that the pole itself would carry none of the force. In other words, the composite repair system was considered as a splice connecting two independent pieces of pole, as if the pole were completely rotted at the ground line and unable to carry any load. Based upon the result of this type of analysis, the number of layers of strips for a given class pole was then generated by computer analysis.

The thickness requirements for the composite encasement were computed by taking a particular pole length and class, and computing the bending moment at ground line. Using a fiber stress of 8,000 PSI it is indicated in ANSI 05.1 for Douglas fir and Southern pine, a minimum ground line diameter was determined. The diameter was consistent with the circumference required by ANSI 05.1 at six feet from the butt of the pole. The bending stress in the composite encasement is computed considering the encasement to have the same diameter as the pole diameter. A limiting vertical casing stress determined by empirical testing, was used in determining the thickness of the composite encasement required for a given pole class and length.

In addition to resisting bending moment, the repair system also transfers lateral load into the lower section of the pole. Therefore, the cross section of the composite encasement must resist the sheering forces. The composite encasement thickness required to resist the sheer is quantified by the formula: $T=2\times V/3.14\times D\times f$), where V equals the antiload dependent on the pole class, D equals the diameter of the composite encasement and f equals the allowable sheer stress, determined from empirical testing), range investigated it has been conservatively added to the thickness required to resist the bending moment. This approach vertical tension ratios.

To validate the above simple analyses a computer model of the pole casing system was also evaluated. The computer analyses confirmed the suitability of the above described analyses as the resulting stresses were very similar in magnitude.

These computer analyses also confirmed the interaction behavior of the composite encasements in the pole as the pole and the casing work together, or compositely to resist applied forces. To work compositely, the forces in the pole transfer from the pole to the composite encasement. The testing and analyses indicate that to accomplish the load transfers the casing must be bonded to the wood. The minimum length of composite encasement required to transfer the forces is about equal to the pole diameter. For design purposes, two diameters have been selected to account for variations in pole materials and bond stress along the bond length. The transfer length is the overlap of the casing and good quality wood. The normal repair arrangement therefore, as described therefore with the composite encasement extending about three feet above and below grade is suitable for the common pole sizes, for the decay will be limited to the immediate ground line region of the pole. Based upon the above evaluations, the total composite encasement thicknesses required for the normal range of pole classes is exemplified in the following table, which gives thicknesses in multiples of one sixteenth of an inch indicating how a given casing thickness is applicable for a range of pole sizes and classes. For example a half inch composite encasement could be used for a 75 foot class 3 pole or for a thirty five foot class H2 pole.

TABLE 2

| Total Shell Thickness Required (1/16 in.) | | | | | | | | |
|---|---|---|---|---|---|---|---|---|
| Pole | Ground | Mo- | ←Pole Class and ANSI Load (LB)→ | | | | | |
| Length (ft) | to Butt | ment Arm (ft) | 4 2400 | 3 3000 | 2 3700 | 1 4500 | H1 5400 | H2 6400 |
| 20 | 4.0 | 14.0 | 5.00 | 5.00 | 6.00 | 6.00 | | |
| 25 | 5.0 | 8.0 | 5.00 | 6.00 | 6.00 | 7.00 | | |
| 30 | 5.5 | 22.5 | 6.00 | 6.00 | 7.00 | 7.00 | | |
| 35 | 6.0 | 27.0 | 6.00 | 6.00 | 7.00 | 7.00 | 8.00 | 8.00 |
| 40 | 6.0 | 32.0 | 6.00 | 7.00 | 7.00 | 8.00 | 8.00 | 9.00 |
| 45 | 6.5 | 36.5 | 7.00 | 7.00 | 8.00 | 8.00 | 9.00 | 9.00 |
| 50 | 7.0 | 41.0 | 7.00 | 7.00 | 8.00 | 8.00 | 9.00 | 9.00 |
| 55 | 7.5 | 45.5 | 7.00 | 8.00 | 8.00 | 9.00 | 9.00 | 10.00 |
| 60 | 8.0 | 50.0 | 7.00 | 8.00 | 8.00 | 9.00 | 9.00 | 10.00 |
| 65 | 8.5 | 54.5 | 7.00 | 8.00 | 8.00 | 9.00 | 10.00 | 10.00 |
| 70 | 9.0 | 59.0 | 8.00 | 8.00 | 9.00 | 9.00 | 10.00 | 10.00 |
| 75 | 9.5 | 63.5 | | 8.00 | 9.00 | 9.00 | 10.00 | 11.00 |
| 80 | 10.0 | 68.0 | | 8.00 | 9.00 | 10.00 | 10.00 | 11.00 |
| 85 | 10.5 | 72.5 | | 9.00 | 9.00 | 10.00 | 10.00 | 11.00 |
| 90 | 11.0 | 77.0 | | 9.00 | 9.00 | 10.00 | 11.00 | 11.00 |
| 95 | 11.0 | 82.0 | | | 10.00 | 10.00 | 11.00 | 11.00 |
| 100 | 11.0 | 87.0 | | | 10.00 | 10.00 | 11.00 | 12.00 |
| 105 | 12.0 | 91.0 | | | 10.00 | 11.00 | 11.00 | 12.00 |
| 110 | 12.0 | 96.0 | | | 10.00 | 11.00 | 11.00 | 12.00 |
| 115 | 12.0 | 101.0 | | | 10.00 | 11.00 | 12.00 | 12.00 |
| 120 | 12.0 | 106.0 | | | 10.00 | 11.00 | 12.00 | 12.00 |
| 125 | 12.0 | 111.0 | | | 11.00 | 11.00 | 12.00 | 13.00 |

As indicated in the above table the number of strips of glass mat required to repair any given pole will vary depending upon the pole's length, class, and design load. The number can be easily determined in the field by a workman with a tape measure, who simply applies strips until the required thickness is reached. The application of the strips will be discussed in further detail below.

METHOD OF APPLICATION OF THE PREFERRED EMBODIMENT

The primary embodiment of the present invention comprises a kit with two five gallon buckets, a roll of glass mat, a shovel, and tape measure. Workmen simply go out and excavate the base of the utility pole until they have a hole large and deep enough to work in to clean the pole to a depth of 3 feet below ground line. After they have the hole dug, they will take a wire brush or equivalent to scrape down the pole and restore the surface. Then holes are drilled into the pole and the fumigant is pumped into it. The best method for the repair is to set up a table for working the resin. In general, the table is tray-shaped and generally, the mat is supplied in a roll, and the strips are simply rolled off and cut at six foot lengths. The resin and the catalyst is mixed on the table, the glass strip is laid into the mix, and then worked with a paint roller, rolled back and forth, until the glass mat is saturated with the resin. As one man is working the resin into the glass mat, another is applying the saturated mat strips to the cleaned portion of the utility pole from approximately three feet below the ground line to three feet above the ground line. The saturated glass mat is simply placed against the pole, and then rolled with a paint roller to work the glass. When the resin becomes transparent, the workmen know there are no air pockets. The strips are overlapped by hand, beginning on one side of the pole, rolling on the first proceeding around the pole. Because the workmen will be supplied with the information embodied in the table above, which describes the thickness of composite encasement required for any given class and length pole, the saturated glass strips are simply applied until the desired composite encasement thickness has been reached. The workmen who are responsible for applying the saturated glass strips can then move their saturation table and the buckets to the next pole where the workmen with the shovel already has the hole completed. By the time the workmen have moved and reset their saturation table, the composite encasement applied to the previous pole will be ready for the application of the ultraviolet inhibiting coating and the hole can be filled back in within 15 minutes of that application.

An additional advantage of this method of application over the prior art repair systems, is that many utility poles are equipped with ground wires, small wooden molding, disconnects, switch handles, riser pipes, and other devices of a like nature. Any type of mechanical device repair system would require the complete disassembly of the above mentioned devices. With the composite repair system of the present invention, any attachment to the utility pole has only to be pulled out enough to be able to slip a sheet of saturated glass material behind it.

The entire process, including digging the holes, takes about an hour and a half to two hours, depending upon how efficient the workmen are. This time includes up to an hour for the digging of the hole, so the time savings, as compared to prior techniques are readily apparent, as are the differences in equipment required.

A further advantage that the repair system of this invention exhibits over prior devices, is that in many cases a utility pole is installed so closely to building or concrete footings or the like that there is not enough clearance all the way around the pole for prior art encasement methods. The method of this invention requires only the width of the fiberglass plus perhaps, a few inches of space to work the glass. An additional advantage exhibited by the repair technique of the present invention is that a fumigant to kill bacteria and fungus can be injected into the rotted area of the pole. Once such a fumigant has been injected, and the composite encasement applied, the fumigant is sealed within that area and it will permeate the wood. Being encapsulated, the fumigant will not escape from the pole and will last much longer in contrast to the non-encapsulated splinting type prior art repair methods.

It is to be understood that many combinations and subcombinations of the concepts taught by this specification will be obvious to those in the art. As many possible embodiments of this invention may be made without departing from the spirit or scope, it is to be understood that all matters set forth are shown in the accompanying drawings, but to be interpreted as illustrative and not in a limiting sense.

What is claimed is:

1. A method of repairing a utility pole in situ comprising steps of:

(a) excavating around said utility pole to a predetermined depth;

(b) cleaning the surface of said pole;

(c) treating said surface;

(d) selecting and preparing a plurality of [longitudinal] woven fiber [mat strips] *mats*;

(e) saturating said [strips] *mats* with [the] *a* liquid composite;

(f) positioning each [strip with the longitudinal dimension of each strip substantially parallel to the longitudinal axis of said pole] *mat with the fibers of a first direction of the weave oriented substantially parallel to the longitudinal axis of said pole and the fibers of a second direction of the weave oriented at an angle relative to said first direction*; and, (g) applying said [strips] *mat* sequentially and circumferentially with each succeeding [strip] *mat* overlapping its preceding [strip] *mat*, around the circumference of said pole to form a cylindrical encasement of desired thickness; wherein the manner of applying the saturated woven mat [strips] comprises:

(i) fully saturating each [strip by placing the woven mat into a tray filled] *mat* with [the] *said* liquid [composite and rolling the mat strip with a paint roller];

(ii) [removing said saturated mat strips from the tray and] aligning each *mat* with the [longitudinal axis of the utility pole] *fibers of a first direction of the weave oriented substantially parallel to the longitudinal axis of said pole and the fibers of a second direction of the weave oriented at an angle relative to said first direction* and then pressing it against the surface of the utility pole at the repair location;

(iii) [rolling said saturated woven mat strips with the paint roller to press] *pressing* the saturated mat against the pole surface and [to ensure] *ensuring* that no air bubbles are entrained;

(iv) repeating the process with the next woven mat [strip] which is saturated [in the tray]; and then placed against the utility pole so that [one half of] the second mat [strip] overlaps [half of] the first mat [strip] already in place;

(v) [rolling] *pressing* the second mat [strip with a paint roller] to ensure that no air bubbles are entrained; and, (vi) repeating the saturated mat [strip] application until the [composite] *cylindrical* encasement [cylinder shell] reaches the desired thickness.

2. A method of applying a bonded structural encasement to wooden poles comprising the steps of:

(a) cleaning a portion of the surface of the poles;

(b) selecting a material wherein: lengthwise fibers comprise from 50% to 80% of the total fiber; half of the remaining fibers total from 10% to 25% of the total fibers placed at an angle relative to the lengthwise fibers; and, the remaining 10% to 25% of the fibers placed at an equal angle relative to the lengthwise fibers in the opposite direction relative to the first angled fibers;

(c) saturating woven fiber [strips] *mats* of said material with a composite resin;

(d) selecting and applying a plurality of saturated [strips] *mat* to the clean surface in sequence with each succeeding [strip] *mat* overlapping its preceding [strip] *mat* around the circumference of said pole and *having its lengthwise fibers* substantially parallel to the longitudinal axis of said pole to form upon hardening into a cylindrical encasement;

(e) applying an ultraviolet resistant coating to the exterior of the encasement; and, (f) pumping a fumigant into the pole to arrest biological agents.

3. A method of applying a bonded structural encasement to wooden poles comprising the steps of:

(a) cleaning a portion of the surface of the poles;

(b) selecting a material wherein; lengthwise fibers comprise from 50% to 80% of the total fibers, half of the remaining fibers total from 10% to 25% of the total fibers placed at an angle relative to the lengthwise fibers; and, the remaining 10% to 25% of the fibers placed at an equal angle relative to the lengthwise fibers in the opposite direction relative to the first angled fibers;

(c) applying a bonding agent to the cleaned surface prior to applying [the] *a plurality of* saturated [strips,] *mats of said material*;

(d) saturating *said* woven fiber [strips] *mats* of said material with a composite resin;

(e) selecting and applying [a] *said* plurality of saturated [strips] *mat* to the cleaned surface in sequence, with each succeeding [strip] *mat* overlapping its preceding [strip] *mat* around the circumference of said pole and *having its lengthwise fibers* substantially parallel to the longitudinal axis of said pole to form upon hardening into a cylindrical encasement;

(f) applying an ultraviolet resistant coating to the exterior of the encasement; and, (g) pumping a fumigant into the pole to arrest biological agents.

4. A method of repairing a utility pole in situ comprising the steps of:

(a) excavating around said utility pole to a predetermined depth;

(b) cleaning and treating the surface of said pole;

(c) pumping a fumigant into [the] *said* pole to arrest biological agents;

(d) applying an ultraviolet resistant coating; and (e) applying a bonding agent to [the] *said* cleaned surface prior to applying the saturated [strips] *mats*;

(f) saturating woven fiber [strips] *mats* with a *liquid* composite [resin];

(g) fully saturating each [strip by placing the woven mat into a tray filled] *mat* with [the] *said* liquid composite [and rolling the mat strip with a paint roller];

(h) [removing said saturated mat strips from the tray and] aligning each [with the longitudinal axis of the utility pole] *mat with the fibers of a first direction of the weave oriented substantially parallel to the longitudinal axis of said pole and the fibers of a second direction of the weave oriented at an angle relative to said first direction* and then pressing it against the surface of the utility pole at the repair location;

(i) [rolling] *pressing* said saturated woven mats [strips with a paint roller to press the saturated mat] against the pole surface [and] to ensure that no air bubbles are entrained;

(j) repeating the process with the next woven mat [strip] which is saturated [in the tray]; and then placed against the utility pole so that the second mat [strip] overlaps the first mat [strip] already in place;

(k) the step of preparing said [strips] *mats* comprises selecting a woven fiber mat wherein lengthwise fibers comprise from 50% to 80% of the total fibers within a mat and half the remaining 10% 25% of the fibers are placed at an angle relative to the lengthwise fibers; and, wherein the remaining 10% to 25% of the fibers are placed at an equal angle relative to the lengthwise fibers in the opposite direction relative to the first angled fibers, (l) selecting and applying a plurality of saturated [strips] *mats* to the cleaned surface in sequence, with each succeeding [strip] *mat* overlapping its preceding [strip] *mat* around the circumference of said pole and *having its lengthwise fibers* substantially parallel to the longitudinal axis of said pole to form upon hardening into a cylindrical encasement.

* * * * *